S. H. POWERS.
Horse Hay-Rakes.
No. 199,103. Patented Jan. 8, 1878.
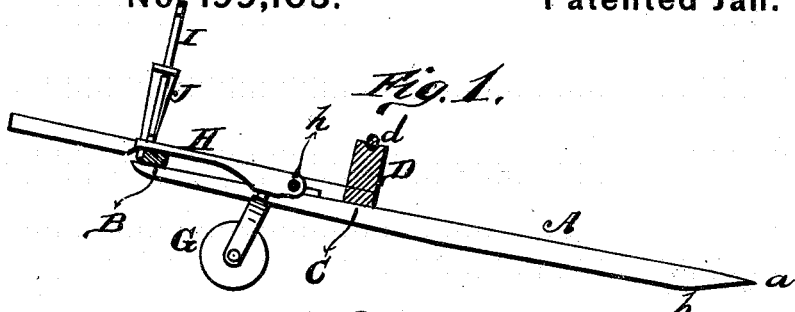
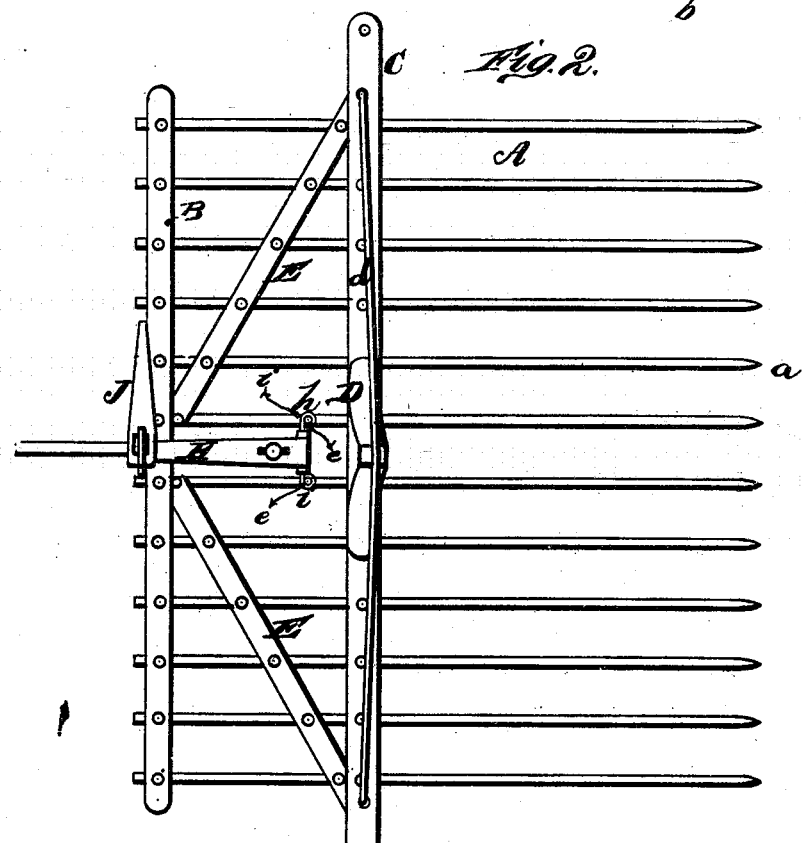
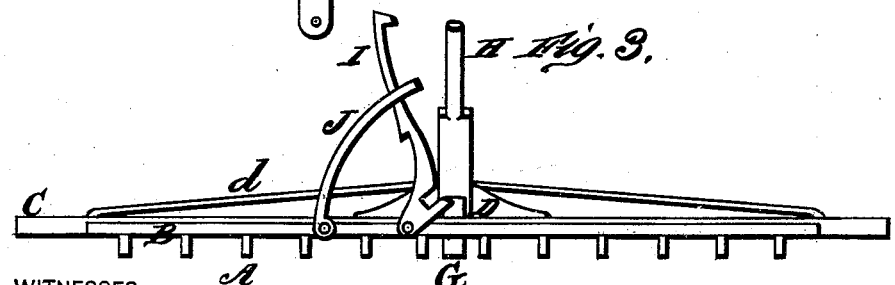
WITNESSES
Robert Everett
George E. Upshaw
INVENTOR
Seth H. Powers.
Gilmore, Smith & Co.
ATTORNEYS.

UNITED STATES PATENT OFFICE.

SETH H. POWERS, OF SALISBURY, MISSOURI, ASSIGNOR OF ONE-THIRD HIS RIGHT TO J. L. DOBSON, OF SAME PLACE.

IMPROVEMENT IN HORSE HAY-RAKES.

Specification forming part of Letters Patent No. 199,103, dated January 8, 1878; application filed August 25, 1877.

*To all whom it may concern:*

Be it known that I, SETH H. POWERS, of Salisbury, in the county of Chariton and State of Missouri, have invented a new and valuable Improvement in Horse Hay-Rakes; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical sectional view of my horse hay-rake. Fig. 2 is a plan view, and Fig. 3 is a front view, thereof.

The nature of my invention consists in the construction and arrangement of a horse hay-rake, as will be hereinafter more fully set forth.

The annexed drawing, to which reference is made, fully illustrates my invention.

A A represent a series of rake-teeth, connected at their rear ends by a cross-bar, B, fastened on their upper sides. A short distance in front of this bar is a beam, C, also secured to the upper sides of the teeth, and said two bars or beams are connected by diagonal bars E E, as shown. $d$ is a rod, the ends of which are fastened in the beam C, near the ends thereof, and passes over a solid bridge, D, fastened on the center of said beam, for the purpose of bridging said rod. The rod $d$ supports the ends of the beam C to keep them from sagging.

The teeth A are constructed as shown, having their front ends beveled to form the points $a$, and from the bevel of said point the under side of each tooth is made sloping to the heel $b$, which makes the rake run easier on the ground, and also makes it lighter, while it is fully as strong as if the original thickness of the teeth were maintained.

From the heel $b$ to the cross-bar B the tooth A gradually decreases in thickness, whereby strength is given at the heel of the tooth, and greater lightness is secured.

Between the two center teeth of the rake, in rear of the beam C, is pivoted a lever, H, which carries on its under side, at the inner end, a caster-wheel, G. The lever H is hinged by means of a wire, $h$, passing through it, and the ends of the wire bent to form eyes $i\ i$, that are passed over headed pins $e\ e$ in the top of the teeth.

The lever H is held down on the bar B by a hook, I, and this hook latched or locked by means of a latch, J.

The caster-wheel G, being in the center of the rake, facilitates the draft and turning; and the rake resting on the center, in the rear, lets the teeth of the rake adjust themselves to the unevenness of the ground.

By means of the lever H the rear end of the rake may be raised and lowered, as desired, and by means of the hook and latch the lever is held down.

What I claim as new, and desire to secure by Letters Patent, is—

1. In combination with a horse hay-rake, the central caster-wheel G, attached to the hinged lever H, and held in position by means of a hook, I, substantially as and for the purposes set forth.

2. In combination with the hinged lever H, carrying caster-wheel G, the hook I and latch J, substantially as and for the purposes set forth.

In testimony that I claim the above I have hereunto subscribed my name in the presence of two witnesses.

SETH HOWARD POWERS.

Witnesses:
THEOPHILUS NEWBOLD,
JAMES L. DOBSON.